United States Patent [19]

Krampe et al.

[11] 4,390,821
[45] Jun. 28, 1983

[54] DEVICE FOR CHANGING THE RELATIVE ANGULAR POSITIONS OF OPERATING SHAFTS OF A GROUP ELECTRIC DRIVE

[75] Inventors: Dietrich Krampe, Neunkirchen; Herbert Schleicher, Dettingen, both of Fed. Rep. of Germany

[73] Assignee: Siemens Aktiengesellschaft, Berlin and Munich, Fed. Rep. of Germany

[21] Appl. No.: 289,169

[22] Filed: Aug. 3, 1981

Related U.S. Application Data

[63] Continuation of Ser. No. 136,356, Apr. 1, 1980.

[30] Foreign Application Priority Data

Apr. 12, 1979 [DE] Fed. Rep. of Germany ....... 2515035

[51] Int. Cl.³ .......................................... H02P 5/46
[52] U.S. Cl. .................................... 318/85; 318/86; 318/60

[58] Field of Search ................. 318/34, 85, 86, 90, 318/87, 59, 60, 61, 63, 64, 110, 112, 101, 102, 103, 66, 50; 307/84, 87

[56] References Cited

U.S. PATENT DOCUMENTS

| | | | |
|---|---|---|---|
| 3,536,968 | 10/1970 | Alabone et al. | 318/85 X |
| 3,757,179 | 9/1973 | Pedersen | 318/85 |
| 3,789,233 | 1/1974 | Winter | 318/61 X |
| 3,908,132 | 9/1975 | Krampe et al. | 307/87 |
| 3,967,170 | 6/1976 | MacDonald et al. | 318/85 |
| 4,061,948 | 12/1977 | Lamparter | 318/112 X |
| 4,135,118 | 1/1979 | Seeger et al. | 318/85 |

*Primary Examiner*—Ulysses Weldon
*Attorney, Agent, or Firm*—Kenyon & Kenyon

[57] ABSTRACT

An electric group drive having synchronous motors which are fed from a static operating converter has a second converter for use in varying the relative angle position of the motors. Provision is made for using the second converter as a start-up and braking converter. A phase shifter and memory-oriented control logic are used to control the processes.

3 Claims, 5 Drawing Figures

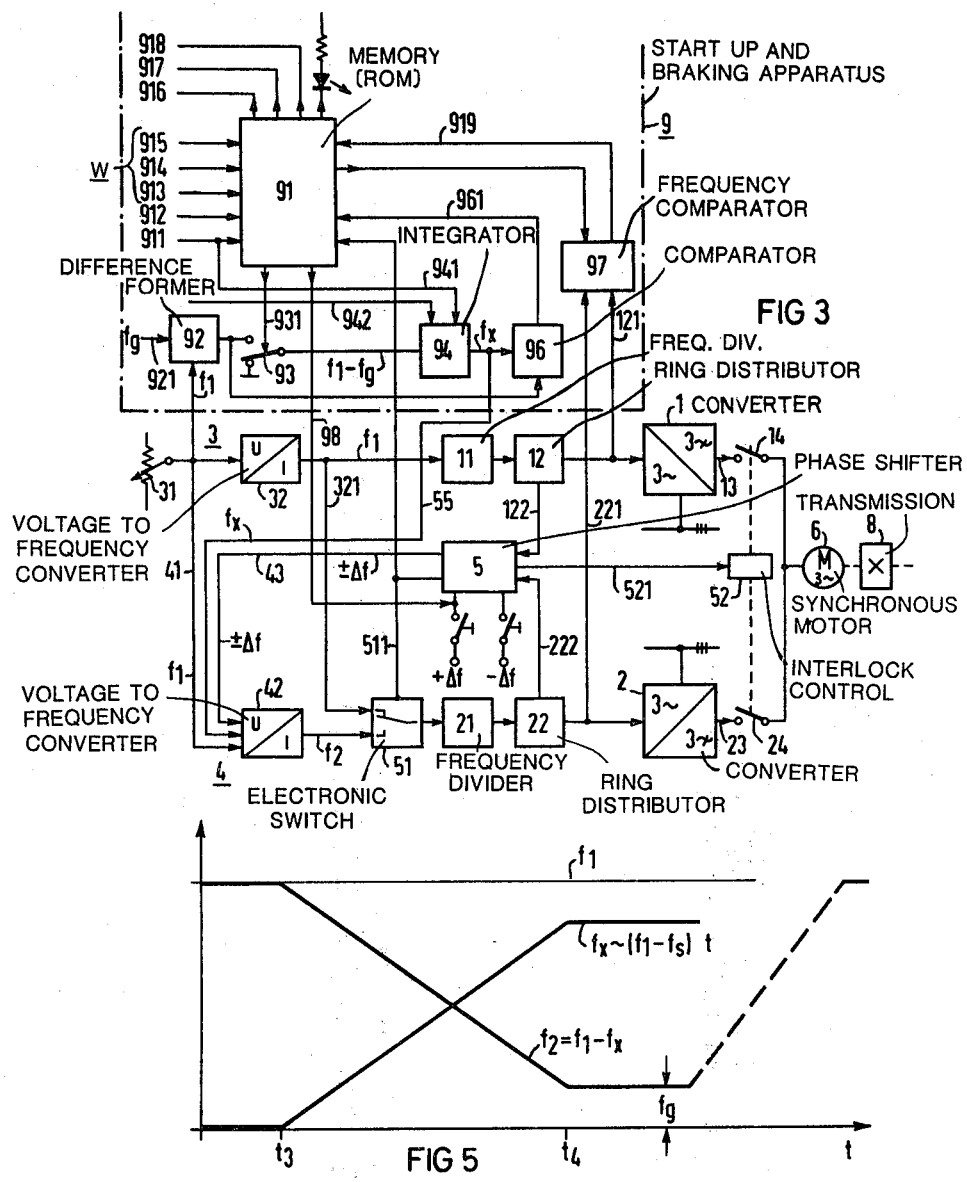

DEVICE FOR CHANGING THE RELATIVE ANGULAR POSITIONS OF OPERATING SHAFTS OF A GROUP ELECTRIC DRIVE

This is a continuation of application Ser. No. 136,356, filed Apr. 1, 1980.

BACKGROUND OF THE INVENTION

This invention relates to a group electric drive in which the individual operating shafts are coupled to synchronous motors, the motors being being connected to an operating static converter. The output voltage frequency and phase of the converter depends on a control frequency from a frequency generator.

In order to change the angular position of an operating shaft relative to another shaft in a group, a second phase shifting converter is provided, which operates at the same voltage amplitude and is initially connected to the same frequency generator as the operating converter. The synchronous motor whose phase angle position is to be changed is connected to the phase shifting converter and, after being switched to a second frequency generator, the phase angle is changed by varying the frequency of the second frequency generator in the direction of the desired change.

After the desired angle position is reached, the phase shifting converter can again be connected to the frequency generator of the operating converter if the phases of the output voltages of the converters as determined by an appropriate detector agree. Subsequently, the synchronous motor is connected back to the operating converter.

Thus, in this arrangement, the additional converter serves for correcting the phase angle positions of individual motors with respect to the phase angle position of a lead motor.

Often it is required that relatively large motors be connected to a converter network operating, for instance, at a frequency of 150 Hz. To make such a switching action permissible the power rating of the operating converter described above would have to be increased substantially. Furthermore, excessive thermal stressing of the motors, due to slip losses, may occur.

It is an object of the present invention to provide a device of a type described above in which the addition or removal of motors to or from a group running at the operating frequency can be accomplished at no extra cost.

SUMMARY OF THE INVENTION

According to the invention, the problem outlined above is solved by providing for control of the second converter for start-up and braking by appropriate changes in the operation of the second frequency generator. Thus, the additional converter now has a triple function serving, as a phase shifting converter, a start-up converter, and a braking converter. In each of these three functions the additional converter operates synchronously with the operating converter when the supply systems for the load are changed. This ensures a quasismooth transition, which is a prerequisite for converters of low power rating and for the protection of the motors. It should also be mentioned that the braking function, being an inversion of the start-up function, requires practically no extra expenditure at all.

BRIEF DESCRIPTION OF THE DRAWINGS

FIG. 3 is a block diagram of the control and of the interconnecting circuitry for the two converters;

FIG. 5 is a chart showing the frequency relationships, plotted against time, during the braking process.

DETAILED DESCRIPTION OF THE INVENTION

Figure 1:
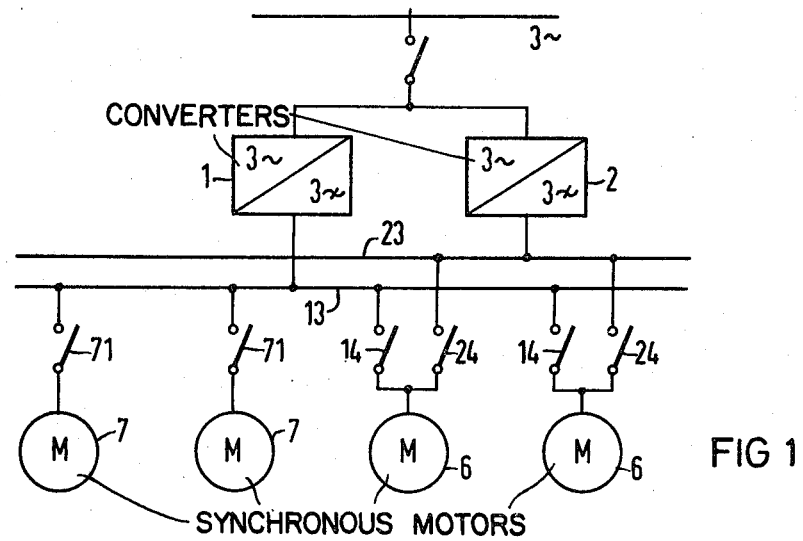
FIG. 1 is a block diagram of the power supply for a multiple motor drive.

FIG. 1 shows the interconnection, on the power side, between an operating converter 1, a second converter 2, and a number of synchronous motors 6 and 7. The converters are constructed, in a manner known in the art, as static frequency converters using thyristors; they have the same output voltage amplitude but, as a rule, have different power ratings.

Figure 2:
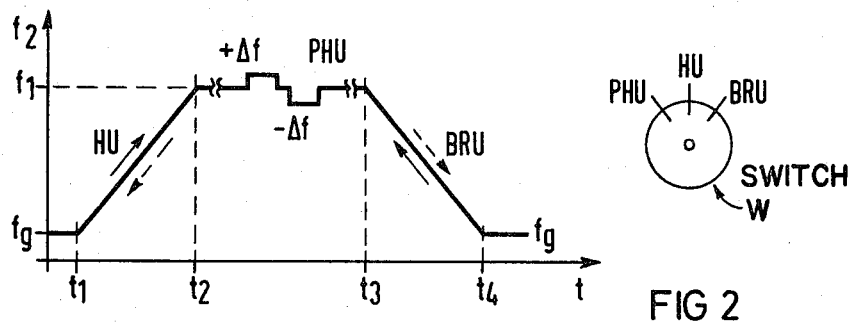
FIG. 2 is a diagram showing the three operating ranges of the auxiliary converter.

There are two variable-frequency supply buses 13 and 23 which are supplied by converters 1 and 2, respectively. All synchronous motors 7 are connected, via switches 71, to bus 13. The angle position of the motors relative to each other is inflexible, but can have any desired angle. Angle correction is not necessary here. The angular positions of the operating shafts (not shown) driven by motors 6, on the other hand, must be variable relative to each other, depending on the technological situation, and must, once set, continue to run inflexibly locked. These motors can be connected as desired to supply buses 13 or 23 via switches (contactors) 14, 24. In general, connection of the motors to the operating converter must be possible for every frequency setting range. When the motors are, for example, low-power motors, this is possible at any time. In the case of motors 6, which may be, for example, of a relatively high power rating, however, indiscriminate, direct connection at any frequency must be limited or prevented entirely in view of the large starting currents. In such case, the problem is solved with a starting-up converter. Second or auxiliary converter 2 is used for this purpose; it now serves as the starting-up converter. By inverting its starting-up function, it can function for braking. The shape of the required curve of frequency output (against time) of auxiliary converter 2 is shown in FIG. 2. When selector switch W is positioned in the operating mode "HU", or "starting-up converter", the load to be accelerated is connected at time $t_1$ at the frequency $f_g$. Subsequently, converter 2, with the lead, is run-up and reaches the frequency $f_1$ of converter 1 at time $t_1$. At this time, the two converter systems having been synchronized, switching from converter 2 to converter 1 is enabled. If the phase angle position of the motor is to be corrected, the phase shifting process, accomplished by changing the frequency $\pm \Delta f$, is initiated by placing selector switch W at the position "PHU".

If a motor 6 is to be braked at a time $t_3$, selector switch W is set at "BRU" and converter 2 now acts as a braking converter, taking over motor 6, at synchronism, from operating converter 1 and then braking it down to the frequency $f_g$. At the time $t_4$, the load can then be shed and the motor shut down. The braking converter is then run directly up to frequency $f_1$ of converter 1 and is put into standby position for another braking process.

A circuit for realizing the functions described above is shown in the block diagram of FIG. 3. In this arrangement, a synchronous motor 6 which drives a mechanical load, not shown, via a transmission 8, can be connected via switches 14 and 24 and buses 13 and 23, as desired, to operating converter 1 or to second converter 2. Switches 14 and 24 are operated by an interlocking control device 52.

A voltage proportional to the desired operating frequency $f_1$ can be taken off at a potentometer 31; the voltage is converted in a voltage-to-frequency converter 32 into a pulse frequency $f_1$. The pulses from this frequency generator 3 (potentiometer 31 and the voltage-to-frequency converter 32) are fed to a ring distributor 12 via a frequency divider 11. Ring distributor 12 forms an important part of the control logic for converter 1. It controls the delivery of firing commands to the converter thyristors and the frequency and phase of the output voltage of the operating converter 1 is thereby determined.

A ring distributor 22 for driving converter 2 can also be connected to frequency $f_1$ generator 3 via an electronic switch 51 and a frequency divider 21. Ring distributor 22 can also be connected to second frequency generator 4 by means of electronic switch 51. Frequency generator 4 consists of a voltage-to-frequency converter 42 which receives its voltage from the potentometer 31 via line 41. Thus, frequency generator 4 furnishes the same control frequency as frequency generator 3. Operation of switch 51, via line 511, control of interlocking device 52, via line 521, and a frequency-controlling intervention into frequency generator 4, via line 43, are brought about by a phase shifter 5 which responds to the state of the ring distributors 12, 22.

The function of start-up and braking unit 9 will be explained later on.

First, the operation of the phase shifter with respect to an individual motor 6 will be explained in detail, making reference to FIG. 3.

Operating converter 1 and second converter 2 are at first connected to the three-phase network and run at the operating frequency $f_1$ which is provided to second converter 2 by frequency generator 3 via line 321 and switch 51. Since both converters are supplied with the same controlling frequency, the operating frequencies are equal.

By continuous comparison of the phases of ring distributors 12 and 22 it is also ensured that the phases of both converters 1 and 2 are in agreement at their output terminals, i.e., that the phases are also equal. Interlocking device 52 enables switches 14 and 24 via line 521 only when the phases are reported equal continuously by phase shifter 5.

Now, the phase of motor 6, and thereby of the operating shaft coupled to it, is to be changed. To this end, motor 6 is transferred from operating converter 1 to converter 2; i.e., switch 14 is opened and switch 24 closed. The transfer takes place practically without shock and without angle error because of the existing frequency and phase equality.

When one of the push buttons for $+\Delta F$ or $-\Delta F$ is actuated, the frequency input to converter 2 is moved away from frequency generator 3, being switched by frequency switch 51 to frequency $f_2$ of generator 4. Also, by the switching action, an additional reference value $+\Delta f$ or $-\Delta f$ is fed to voltage-to-frequency converter 42 via line 43; that is synchronous motor 6 is accelerated or decelerated. When the operating shaft coupled to synchronous motor 6 has reached the desired angular position, the command given via push buttons $\pm \Delta F$ if cancelled. Then frequency generator 4 runs again with approximately the frequency of frequency generator 3 plus a defined drift frequency. Phase shifter device 5 ascertains the phases of $f_1$ and $f_2$ of ring distributors 12 and 22 via lines 122, 222, and in the event of agreement, activates switch 51 by means of a command on line 511, switching the drive from frequency generator 4 to frequency generator 3 within one frequency period. Thereby, absolute synchronism is reestablished by electrical means.

Phase shifter 5 is described in detail in patent application Ser. No. 19,562, assigned to the same assignee, filed Mar. 12, 1979 in the name of Krampe et al. and entitled APPARATUS FOR CHANGING THE RELATIVE PHASE ANGLES OF OUTPUT SHAFTS OF A MULTIPLE MOTOR ELECTRIC DRIVE. In that patent the second or auxiliary converter 2 serves as the phase shifting converter (operating mode PHU). In the present apparatus a starting-up and braking unit 9 is provided to incorporate means by which converter 2 can also be operated as a starting-up converter (operating mode HU) and as a braking converter (operating mode BRU). As already mentioned, the operating mode can be set by a selector switch W.

The auxiliary starting-up and braking equipment 9 consists essentially of a memory-oriented control logic 91, into which the following information can be entered:

On line 915, selection of the operating state "phase shift";
On line 914, selection of the operating state "braking";
On line 913, selection of the operating state "starting up";
On line 912, the report "load is connected";
On line 911, the report "overload";
On line 919, the report "frequency equality $f_1 = f_2$" of the two converters 1 and 2.

The existence of frequency equality between lines 121 and 221 is ascertained by frequency comparator 97 which transmits a signal change to control logic 91 on line 919.

Control logic 91 forms the following commands from these input signals:

On line 916, "release the load connection" goes to contactors 14 and 24. On line 917, "release load disconnection" goes to contactors 14 and 24.

Control logic 91 also provides a switch-over command for switch 93, on line 931, and a command to push putton $+\Delta F$, via line 98, to prevent contactors 14 and 24 from being switched during start-up or braking.

Another channel is provided in start-up and braking unit 9, for running converter 2 up to frequency $f_2$ from base frequency $f_g$, at the time $t_1$ to operating frequency $f_1$, at time $t_2$ and for lowering the frequency from the operating frequency, at time $t_3$ to the base frequency, at time $t_4$. This channel for forming an additional frequency component $f_x$, consists of a difference former 92, in which a voltage is generated which corresponds to the difference between a voltage corresponding to the base frequency $f_g$ and the voltage which is proportional to operating frequency $f_1$. The difference voltage $f_1 - f_g$ is fed, via a switch 93, to a start up and run down integrator 94. The output signal $f_x$ of integrator 94 is supplied on line 55 to frequency-determining voltage-to-frequency converter 42 and to comparator 96. The output signal of integrator 94 is compared in comparator 96 with the difference voltage from difference former 92; and when the signals are in agreement, a signal representing "base frequency $f_g$ reached" is formed and transmitted to control logic 91 on the line 961.

The operation of the start-up and braking unit is as follows:

In phase shifting operating mode "PHU", switch 93 is open and the output voltage of integrator 94, which is proportional to $f_x$, is therefore zero. Frequency changes $\pm \Delta f$ are brought about by phase shifter device 5 for the purpose of synchronization, as explained above.

Figure 4:
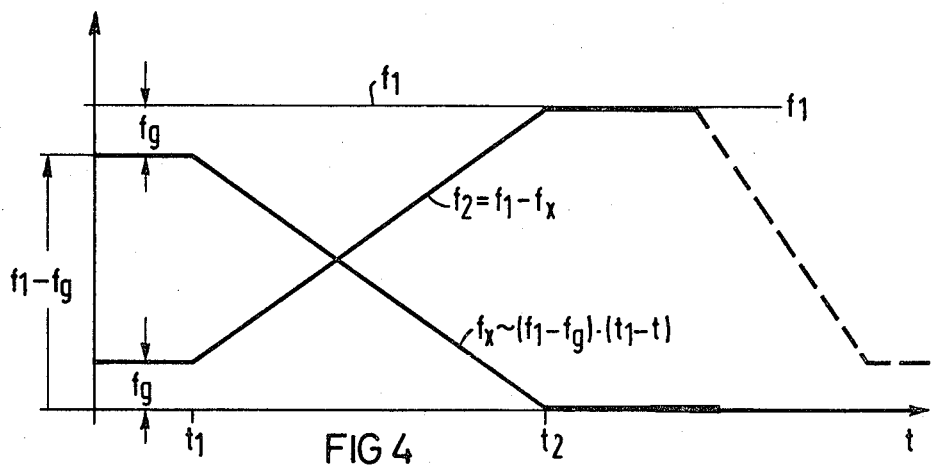
FIG. 4 is a chart showing the frequency curves, plotted against time, during the starting-up process.

In operating mode "HU" the frequency $f_2$ of converter 2 is at the value $f_g$ (FIG. 4). When the start-up command is given, motor 6 is first connected to converter 2 via contactor 24. After the starting current has decayed, converter 2 starts to go from frequency $f_g$ to the operating frequency $f_2$ of converter 1. For this purpose the supplemental voltage which is proportional to frequency $f_x$ is fed, via integrator 94, to the voltage-to-frequency converter 4 which determines the frequency of converter 2. At the beginning of start-up, this supplemental voltage is large; then it drops to zero (FIG. 4). If there are overcurrents during the starting-up process, the integration process is held up via an overload signal (from line 911) on line 941 until the overcurrents have decayed. When converter 2 has reached the frequency $f_1$ of convertor 1, as ascertained by frequency comparator 97, then blocking line 98 is released, and converters 1 and 2 are synchronized with each other as described above in the description of the phase shifter function. When the synchronized state is reached, frequency switch 51 is activated by phase shifter 5, connecting in frequency generator 3, and phase synchronism again prevails. Subsequently, by a signal on line 917 motor 6 is disconnected from bus 23 and converter 2 and connected to bus 13 and converter 1. That is, contactor 24 is opened, and contactor 14 is closed. After contactor 24 is disconnected, frequency switch 51 re-connects converter 2 to the output of voltage-to-frequency converter 42, so that converter 2 can go back with its own frequency generator 4 (on the dotted line of FIG. 4) to the base frequency and into the standby position.

For the braking process, i.e. operating mode "BRU" of converter 2, conditions are inverted from those for start-up (See FIG. 5). For this purpose selector switch W must be in the position "BRU". Operating converter 1 is running with its load, at operating frequency $f_1$. After being connected to frequency $f_1$ converter 2 is in the standby position, being fed via frequency switch 51 from frequency generator 3 with the same frequency $f_1$ as converter 1. Since phase equality prevails, line 916 is activated and interlock 52 is released, permitting switching of the load. Motor 6 is now switched over from converter 1 to converter 2 without shock by opening switch 14 and closing switch 24. Frequency switch 51 then switches converter 2 to frequency generator 4 having frequency $f_2$. After the transient current has decayed, motor 6 is decelerated from frequency $f_1$ to frequency $f_g$. For this purpose a supplemental voltage proportional $f_x$ (FIG. 5) is generated in the auxiliary unit channel. After the base frequency $f_g$ is reached, contactor 24 is opened via line 917 and the motor stops. Converter 2 subsequently runs up quickly from the base frequency $f_g$ to the operating frequency $f_1$ is synchronized with converter 1, and goes into standby position.

The control logic 91 is of extremely simple structure. It comprises a semiconductor memory (ROM), in which the signals on the input lines form the address and the signals on the output lines are formed by the data item located under this address.

Reference is also made to U.S. Pat. No. 3,908,132 for driving the switches 14 and 24 for the purpose of synchronization.

What is claimed is:

1. A control for an electric motor drive comprising:
    at least first and second individual drive shafts, the first drive shaft driven by a first synchronous motor and the second drive shaft driven by a second synchronous motor;
    a first frequency generator having a predetermined frequency output;
    a second frequency generator having an output frequency which is variable in response to at least one frequency control signal;
    a first static converter having an input coupled to the output of the first frequency generator and having a predetermined output voltage;
    a second static converter having an input and having an output voltage equal in amplitude to that of the first static converter;
    means coupling the first synchronous motor to the output of the first static converter;
    first switching means coupling the input of the second static converter to at least one of the output of the first frequency generator and the output of the second frequency generator;
    second switching means for transferring the input of the second synchronous motor between the output of the first static converter and the output of the second static converter, whereby, without noticeable phase angular error, the second synchronous motor can be switched to the second static converter for changing the phase angle position of the second synchronous motor relative to the first synchronous motor, and the input of the second synchronous motor can be subsequently switched back to the output of the first static converter;
    means responsive to phase difference between the inputs to the first and second static converters for enabling the second switching means to reconnect the second synchronous motor to the first frequency converter when the desired angular position has been reached and when the phases of the output voltages of the static converters are in agreement; and
    means coupled to the second frequency generator for driving the second static converter to start up and to brake the second synchronous motor.

2. A control for an electric motor drive in accordance with claim 1 in which the means responsive to the difference in phase comprises a phase shifter responsive to the outputs of the drive controls for synchronizing the second frequency generator with the first frequency generator, for generating a switch signal when the drive controls are synchronized, and for generating a frequency control signal and in which the first switch means is responsive to the switch signal, and further comprising:
    a first converter drive control coupled between the output of the first frequency generator and the input to the first static converter;

a second converter drive control having an input and having an output coupled to the input of the second static converter;

the means for driving the second static converter to start-up and brake the second synchronous motor comprising:

means for comparing the predetermined frequency of the first frequency generator with a predetermined base frequency and generating a difference signal; and means responsive to the difference signal for supplying a second frequency control signal to the second frequency generator as the means for driving the second static converter to start-up and brake the second synchronous motor.

3. A control for an electric motor drive in accordance with claim 2 and further comprising:

a memory having a plurality of address inputs and signal outputs for providing command signals to operate the control, the memory having control data for forming a particular command signal programmed at a particular address;

means coupled to the inputs of the static converters for detecting frequency agreement and transmitting a frequency equality signal to a first address input of the memory;

means coupling the switch signal to a second address input of the memory;

means for comparing the second frequency control signal with the difference signal and transmitting a base frequency reached signal to a third address input of the memory;

means coupled to address inputs of the memory for transmitting thereto signals selecting one of "phase shift", "braking", and "start-up" operating states;

means coupling a release the load connection command signal from a memory signal output to the second switching means for transferring the input of the second synchronous motor from the output of the first static converter to the output of the second static converter;

means coupling a release the load disconnection command signal from a memory signal output to the second switching means for transferring the input to the second synchronous motor from the output of the second static converter to the output of the first static converter; and means coupling a blocking command signal from a memory signal output to the phase shifter for preventing operation of the second switching means while synchronizing is in process.

* * * * *